No. 654,431. Patented July 24, 1900.
O. B. BOLTON.
MACHINE FOR PATCHING SAWS.
(Application filed Sept. 25, 1899.)
(No Model.)
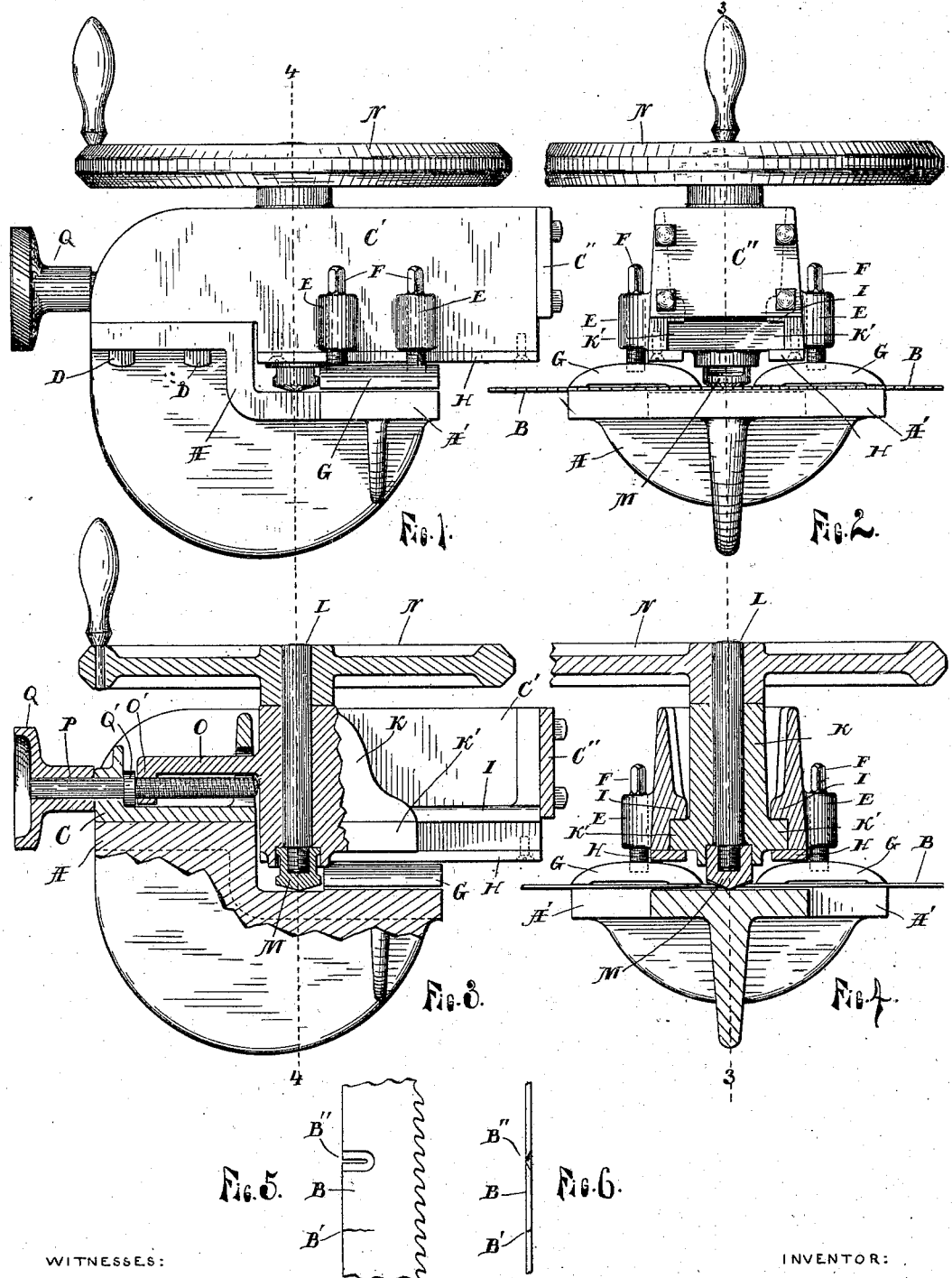
WITNESSES:
George Hollway
William P. Belden
INVENTOR:
Orrin B. Bolton
By
Moulton & Randers
Attorneys

UNITED STATES PATENT OFFICE.

ORRIN B. BOLTON, OF GRAND RAPIDS, MICHIGAN.

MACHINE FOR PATCHING SAWS.

SPECIFICATION forming part of Letters Patent No. 654,431, dated July 24, 1900.

Application filed September 25, 1899. Serial No. 731,513. (No model.)

*To all whom it may concern:*

Be it known that I, ORRIN B. BOLTON, a citizen of the United States, residing at Grand Rapids, in the county of Kent and State of Michigan, have invented certain new and useful Improvements in Machines for Patching Saws; and I do hereby declare the following to be a full, clear, and exact description of the invention, such as will enable others skilled in the art to which it appertains to make and use the same.

My invention relates to improvements in machines for patching saws; and its object is to provide a device that will be light, portable, and easily attached to a saw without the necessity of changing the location of the saw, and whereby a suitable recess may be cut in the saw in which to place the patch, as hereinafter more fully described, and particularly pointed out in the claims.

My invention consists, essentially, in a frame having means for attaching the same to a saw, a carriage slidable in said frame, means for adjusting the carriage, a shaft rotative in a bearing in said carriage and arranged with its axis vertical to the saw, a suitable milling-cutter on the end of the shaft adjacent to the saw, and means for rotating the shaft, as will more fully and in detail appear by reference to the accompanying drawings, in which—

Figure 1 is a side elevation of a device embodying my invention; Fig. 2, an end elevation of the same attached to a saw; Fig. 3, a longitudinal section on the line 3 3 of Figs. 2 and 4; Fig. 4, a transverse section on the line 4 4 of Figs. 1 and 3; Fig. 5, a detail of a portion of a saw in side elevation, and Fig. 6 an edge view of the same.

Like letters refer to like parts in all of the figures.

Saws of all kinds, and especially bandsaws, are liable to crack inward from their outer edges, as shown at B' in Fig. 5, thus rendering them unsafe for use until repaired, which is preferably done by cutting away a portion of the saw, as shown at B'', and brazing in a previously-prepared strip of metal. My machine is especially adapted to attach to a saw wherever situated and to cut the recess B'' in the same.

A represents the lower frame or base of the machine, having the laterally-extended table A', which serves as a rigid jaw of a vise for clamping the saw B.

C is the upper frame, secured to the base A by cap-screws D and having sides C', secured to each other at one end by the plate C''. Said sides are provided with lugs E, which are provided with the screws F, which screws extend downward and engage recesses in movable jaws G of the saw-clamping vise. To the lower edges of the sides C' are secured the strips H, which project inward a short distance and, together with the ribs I on the sides C, form ways engaged by the ribs K' on the carriage K, in which carriage is journaled the shaft L, arranged perpendicular to the plane of the saw and having attached at its lower end a conical cutter M of suitable form to cut the recess B''. To the upper end of said shaft is secured a hand-wheel N to operate the same. An arm O on the carriage K extends longitudinally of the frame and has a downwardly-projecting end O', engaged by the adjusting-screw P, which screw passes through a lug on the frame C and is provided with a hand-wheel Q on its outer end. This hand-wheel engages the lug at one side, and a collar Q' engages the same at the opposite side and prevents the screw from moving longitudinally.

The cutter M is cylindrical in form and is tapped out at one end to receive the reduced and threaded end of the shaft L, and its opposite end is slightly conical and provided with a serrated face. Said cutter is also slightly flattened at two sides for the engagement of a wrench.

From the foregoing description the operation of my device will be readily understood. The saw B to be operated upon is placed between the jaws A' and G, with the cutter M adjacent to the saw and opposite the crack to be patched and the screws F turned down, firmly clamping the machine upon the saw. The cutter M is then rotated by the hand-wheel N and moved into engagement with the saw by turning the screw P, thus moving the carriage K along the ways J and bringing the conical and serrated cutter M into contact with the saw. By continued rotation of the hand-wheel N and screw P a groove having inclined sides and a rounded end is cut in the saw from its edge inward the length of the fracture, as shown at B''. A previously-prepared patch having an outline to conform to the outline of the groove and of the same gage as the saw is then brazed into said groove.

By this construction I secure a light, compact, durable, and inexpensive machine requiring no artificial power to operate and adapted to do the work with despatch and accuracy.

Having thus fully described my invention, what I claim, and wish to secure by Letters Patent, is—

1. The combination of a base and frame attached to each other, and forming the opposing jaws of a clamp adapted to be attached to a saw, ways in the frame parallel with the faces of the jaws, a carriage movable in said ways, a shaft journaled in the carriage with its axis vertical to the faces of the jaws, a conical cutter on one end of the shaft, a crank on the other end of the shaft, and a screw to adjust the carriage in the ways, substantially as described.

2. The combination of a base having a laterally-extended table forming one jaw of a saw-clamping vise, a frame secured to said base, ways in the frame parallel to the face of the table and opposite the same, lugs on said frame, movable members forming the opposite jaw of the vise, screws engaging said lugs and members, a carriage longitudinally movable in ways in said frame, a shaft journaled in said carriage, a conical cutter on one end of said shaft and a hand-wheel on the opposite end of the same, and an adjusting-screw engaging the carriage, substantially as described.

3. In combination, a base having laterally-extended portions forming one jaw of a vise, a frame secured to said base and having sides secured to each other at one end by a plate, lugs on said sides, movable members forming the other jaw of the vise, screws in said lugs entering recesses in said members, ribs on said sides, strips secured to the lower edge of said sides and projecting inward, a carriage, ribs on the same, a shaft journaled in the carriage, a conical cutter on one end of the shaft and a hand-wheel on the opposite end thereof, an arm on the carriage and having a lateral extension, a lug on the frame, an adjusting-screw passing through said lug and extension, and a collar and hand-wheel on the same engaging said lug, substantially as described.

In testimony whereof I affix my signature in presence of two witnesses.

ORRIN B. BOLTON.

Witnesses:
    LUTHER V. MOULTON,
    LEWIS E. FLANDERS.